United States Patent
Hyder et al.

(10) Patent No.: US 7,590,615 B2
(45) Date of Patent: Sep. 15, 2009

(54) SYSTEMS AND METHODS FOR PROVIDING CROSS-VERTICAL PROFILING AND SEARCHING

(75) Inventors: Adam Hyder, Los Altos, CA (US); Jagadish Prasad Samantarai, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 295 days.

(21) Appl. No.: 11/609,294

(22) Filed: Dec. 11, 2006

(65) Prior Publication Data

US 2008/0140711 A1    Jun. 12, 2008

(51) Int. Cl.
*G06F 17/30* (2006.01)
(52) U.S. Cl. .......................................................... 707/1
(58) Field of Classification Search ................. 707/1, 707/100, 204, 205
See application file for complete search history.

(56) References Cited

U.S. PATENT DOCUMENTS

| | | | | |
|---|---|---|---|---|
| 6,651,217 | B1 * | 11/2003 | Kennedy et al. | 715/224 |
| 6,804,664 | B1 * | 10/2004 | Hartman et al. | 707/3 |
| 2003/0050863 | A1 * | 3/2003 | Radwin | 705/27 |

* cited by examiner

*Primary Examiner*—Fred I Ehichioya
(74) *Attorney, Agent, or Firm*—James J. DeCarlo; Greenberg Traurig. LLP

(57) ABSTRACT

Methods and systems of providing a user profile for multiple verticals are disclosed herein. The methods and systems disclosed herein aggregate user profile information from multiple verticals and redistributes aggregated data to the multiple verticals to create more robust personalized profiles. A first input that populates a first vertical attribute in a first vertical profile is received from a user computing device. The first vertical attribute can hold a first value for a user characteristic. A second user input that populates a second vertical attribute in the second vertical profile is received from the user computing device. The second vertical attribute can hold a second value for the user characteristic. The first value of the first vertical attribute is assigned to an attribute in the generic profile if the first vertical attribute is determined to have a greater reliability weight than a reliability weight of the second vertical attribute. The second value of the second vertical attribute is assigned to an attribute in the generic profile if the second vertical attribute is determined to have a greater reliability weight than the reliability weight of the first vertical attribute.

32 Claims, 8 Drawing Sheets

| Weighting for Jobs Vertical User Profile ||
|---|---|
| Attribute | Weight |
| First Name | 1 |
| Last Name | 1 |
| Age | 1 |
| Gender | 0 |
| Profession | 1 |
| Education | 1 |
| Salary Level | 1 |
| Traveling Habits | 0.8 |
| Social Habits | 0.2 |
| Hobbies | 0.5 |
| Entertainment | 0.6 |
| Music Preferences | 0.2 |
| Spending Habits | 0.2 |
| Technology Preference | 0.5 |

| Weighting for Dating Vertical User Profile ||
| --- | --- |
| Attribute | Weight |
| First Name | 0 |
| Last Name | 0 |
| Age | 0 |
| Gender | 1 |
| Profession | 0.5 |
| Education | 0 |
| Salary Level | 0 |
| Traveling Habits | 0.6 |
| Social Habits | 1 |
| Hobbies | 0.75 |
| Entertainment | 0.6 |
| Music Preferences | 0.75 |
| Spending Habits | 0.6 |
| Technology Preference | 0 |

| Weighting for Shopping Vertical User Profile ||
|---|---|
| Attribute | Weight |
| First Name | 0.9 |
| Last Name | 0.9 |
| Age | 0 |
| Gender | 0 |
| Profession | 0 |
| Education | 0 |
| Salary Level | 0.1 |
| Traveling Habits | 0.3 |
| Social Habits | 0 |
| Hobbies | 0.7 |
| Entertainment | 0.4 |
| Music Preferences | 0.6 |
| Spending Habits | 1 |
| Technology Preference | 0.9 |

618 — First Name row — 646
634 — Social Habits — 662
636 — Hobbies — 664
642 — Spending Habits — 670

| Demographic User Profile | |
|---|---|
| Attribute | Value Assigned |
| First Name | (Value of First Name in Job Profile) |
| Last Name | (Value of Last Name in Job Profile) |
| Age | (Value of Age in Job Profile) |
| Gender | (Value of Gender in Job Profile) |
| Profession | (Value of Profession in Job Profile) |
| Education | (Value of Education in Job Profile) |
| Salary Level | (Value of Salary Level in Job Profile) |
| Traveling Habits | (Value of Traveling Habits in Job Profile) |
| Social Habits | (Value of Social Habits in Dating Profile) |
| Hobbies | (Value of Hobbies in Dating Profile) |
| Entertainment | (Value of Dining in Dating Profile) |
| Music Preferences | (Value of Music Preferences in Dating Profile) |
| Spending Habits | (Value of Spending Habits in Shopping Profile) |
| Technology Preference | (Value of Technology Preference in Shopping Profile) |

718 — First Name
720 — Last Name
722 — Age
724 — Gender
726 — Profession
728 — Education
730 — Salary Level
732 — Traveling Habits
734 — Social Habits
736 — Hobbies
738 — Entertainment
740 — Music Preferences
742 — Spending Habits
744 — Technology Preference 746, 748, 750, 752, 754, 756, 758, 760, 762, 764, 766, 768, 770, 772

SYSTEMS AND METHODS FOR PROVIDING CROSS-VERTICAL PROFILING AND SEARCHING

BACKGROUND

1. Field

The present disclosure relates to Internet verticals. In particular, it relates to systems and methods of providing profiling a searching based on one or more Internet verticals.

2. General Background

Internet searching has become a pervasive user activity. In order to provide a better Internet search experience, search engines attempt to personalize searching so that search results are more relevant to the user. Thus, search results can be personalized using user online behavior and preferences. User behavior can be established by tracking user activities online, storing user preferences, etc. In addition, activities for a specific service or vertical can be tracked differently than activities tracked for another service or vertical. Internet verticals generally refer to specialized services such as job listings and recruiting, automobile commerce, real estate, personal dating services, etc.

SUMMARY

In one aspect, there is a method of providing a user profile for multiple verticals. A first input that populates a first vertical attribute in a first vertical profile is received from a user computing device. The first vertical attribute can hold a first value for a user characteristic. A second user input that populates a second vertical attribute in the second vertical profile is received from the user computing device. The second vertical attribute can hold a second value for the user characteristic. The first value of the first vertical attribute is assigned to an attribute in the generic profile if the first vertical attribute is determined to have a greater reliability weight than a reliability weight of the second vertical attribute. The second value of the second vertical attribute is assigned to an attribute in the generic profile if the second vertical attribute is determined to have a greater reliability weight than the reliability weight of the first vertical attribute. User characteristics can be the first name, the last name, the age, the gender, the spending habits, or the social habits of the user.

In one aspect, the first input and/or the second input can comprise the selection of an item listed in the first vertical. In another aspect, the first input and/or the second input can comprise the registration of the user in the first vertical.

In a further aspect, a web search request can be received from the user computing device. Data on the World Wide Web that is relevant to the attribute in the generic profile is identified.

Furthermore, a heavy reliability weight is assigned to the first attribute in the first vertical if it is established that the user will likely provide reliable data for the second attribute in the second vertical. A heavy reliability weight is assigned to the second attribute in the second vertical if it is established that the user will likely provide reliable data for the second attribute in the second vertical.

In another aspect, the first vertical and/or the second vertical can be an Internet service such as an Internet job listing service, an Internet dating service, an Internet product comparison service, Internet automobile purchase service, Internet real estate service, an Internet travel service, an Internet media service, or an Internet social networking service.

In one aspect, the generic profile is a demographic profile, a content profile, a user access profile, or a preferences profile. In a further aspect, the generic profile can be accessible to the first vertical through a first vertical engine. In addition, the generic profile can be accessible to the second vertical through a second vertical engine.

Furthermore, the generic profile can be utilized to personalize search input from a user, search results from a user search, targeted advertisement, or electronic communications.

In one aspect, there is a system to provide user profiling of a user of multiple verticals comprising a network server and a profiling module. The network server receives from a user computing device a first input utilized to populate a first vertical attribute in a first vertical profile. The first vertical attribute can hold a first value for a user characteristic. The network server further configured to receive from the user computing device a second user input utilized to populate a second vertical attribute in the second vertical profile. The second vertical attribute holding a second value for the user characteristic. The profiling module creates a generic profile. The profiling module configured to assign the first value of the first vertical attribute to an attribute in the generic profile if the first vertical attribute is determined to have a greater reliability weight than a reliability weight of the second vertical attribute. The profiling module can be further configured to assign the second value of the second vertical attribute to an attribute in the generic profile if the second vertical attribute is determined to have a greater reliability weight than the reliability weight of the first vertical attribute.

DRAWINGS

The features and objects of alternate embodiments of the present disclosure will become more apparent with reference to the following description taken in conjunction with the accompanying drawings of various examples wherein like reference numerals denote like elements and in which:

FIG. 4 depicts an exemplary table for weighting a jobs vertical user profile according to another embodiment.

FIG. 5 depicts an exemplary table for weighting a dating vertical user profile according to another embodiment.

FIG. 6 depicts an exemplary table for weighting a shopping vertical user profile according to another embodiment.

FIG. 7 depicts an exemplary table of a demographic user profile according to another embodiment.

DETAILED DESCRIPTION

Various methods and systems for profiling and searching are disclosed. A service provider can host one or more verticals. As discussed herein, a vertical is a specialized process or service that provides users a specialized experience within a larger universe of services. For example, within a service provider such as Yahoo!, a vertical can include Calendar, Classifieds, Education, Entertainment, Finance, Food, Games, Health, Horoscopes, Jobs, Kids, Maps, Messenger, Movies, Music, Personals, Photos, Real Estate, Shopping, etc.

Based on user activity on each vertical, user data can be gathered in order to create one or more cross-vertical user profiles that contain the most reliable data selected from each vertical. The most reliable data is obtained by selecting data from vertical-specific profiles that are likely to have such reliable data. For example, users are likely to provide reliable job-related data in a job listing service, reliable entertainment data on a dating service, and reliability traveling preference data on a traveling vertical. Therefore, a horizontal cross-vertical profile can be assembled to have the most reliable data from each vertical-specific profile.

Figure 1:
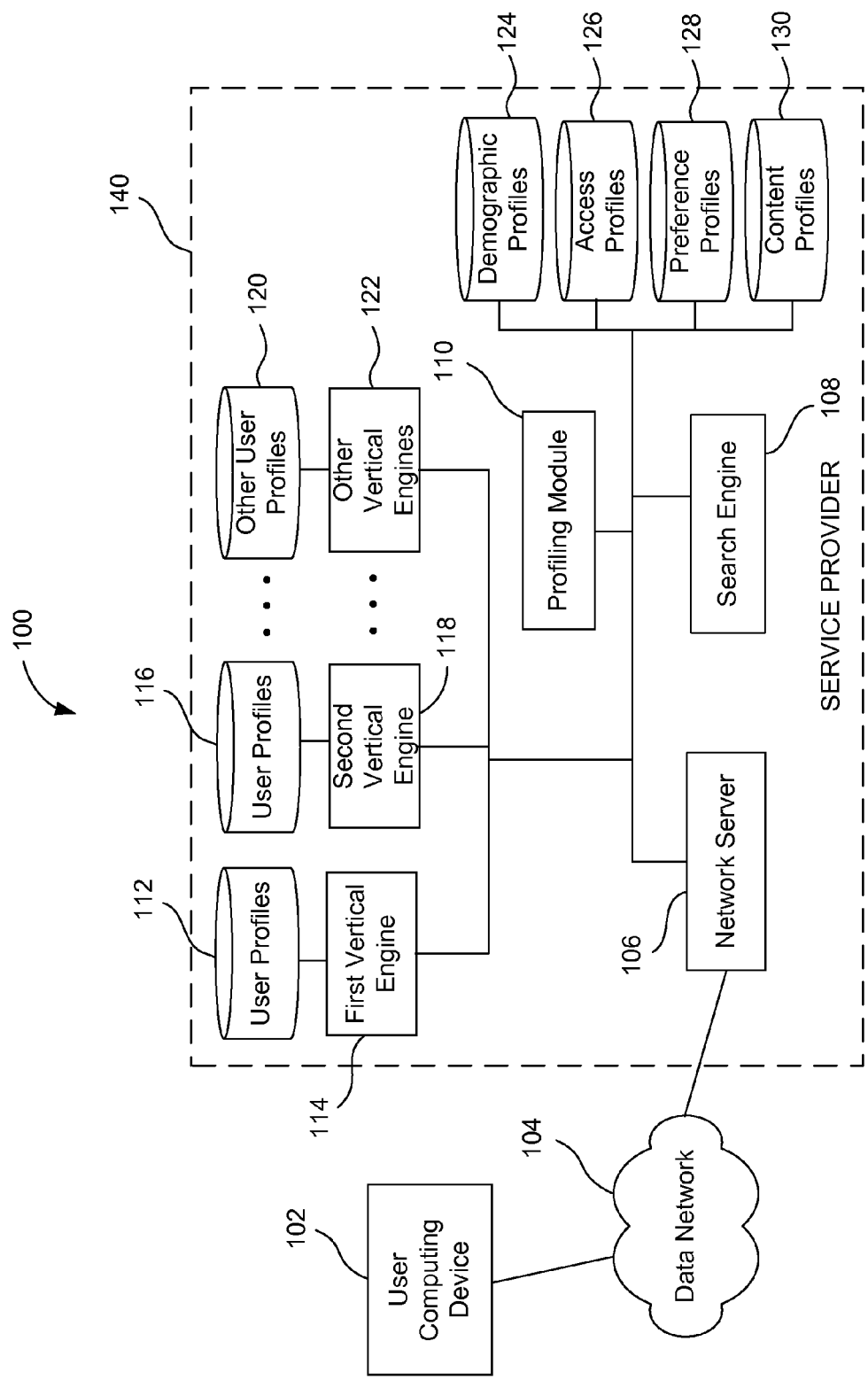
FIG. 1 depicts a component diagram of a system for providing cross-vertical profiling according to one embodiment.

FIG. 1 depicts a component diagram of a system for providing cross-vertical profiling according to one embodiment. In one embodiment, the service provider 140 can host one or more online services or verticals. As such the service provider 140 can be a business entity that owns and operates a computer infrastructure connected to a data network 104 in order to provide a plurality of verticals that can be accessed by users. Users can access the verticals provided by the service provider 140 via a data network 104. In one embodiment, the data network 104 is the Internet. In another embodiment, the data network 104 is an intranet. A user can utilize a user computing device 102 to communicate via the data network 104 with one or more computing modules and or services that are part of the computer infrastructure managed by the service provider 140.

In one embodiment, the computer device 102 can be configured with a web browser that allows the user computing device 102 to send data to and receive data from a network server 106. The computing device 102 communicates with the network server to render web pages received from the network server 106, as well as transmit user input to the network server 106. In another embodiment, the user computing device 102 can communicate through the data network 104 via any client-side application configured to communicate in a predetermined protocol with the network server 106.

In one embodiment, the network server 106 is configured as a portal to multiple verticals provided by the service provider 140. As such, the network server can provide multi-vertical access to a user. For example, the user may access Automobiles vertical where the user can request information about automobiles, post for sale vehicles and parts, view listings, etc. In this example, the network server 106 can communicate with processes, modules, and any other computer infrastructure that can provide with the capability of interacting with the user, and providing the user with information regarding automobiles. Likewise, the network server can also allow for alternative verticals to be explored by the user. For example, the user can request information regarding dating services or job listing services, etc. As one skilled in the art will understand, the network server can be a plurality of servers, each of which can be a server that is dedicated for a specific vertical.

In one embodiment, the network server 106 can be configured to collect explicit data provided by the user. For example, the network server 106 can record user demographic information entered by the user such as first name, last name, age, gender, date of birth, etc. and store such information in one or more user profiles. In addition, each vertical can also be configured with processes or modules configured to store user demographic data or any other explicit data provided by the user. Thus, for example, a first vertical engine 114 corresponding to a first vertical can interact and receive user demographic data from the network server 106 and store the received data at the user profiles database 112. The user profiles database 112 can be a data repository that is specific to the first vertical. Thus, if for example the first vertical is a vertical for job listings, the profiles stored at the user profiles database 112 will correspond to user profiles of jobseekers.

Likewise, the network server 106 can communicate to a second vertical engine 118 data corresponding to interaction of the user with a second vertical. For example, demographic data, content preferences, or any other explicit data provided by the user can be received by the second vertical engine 118 and further stored at the user profile database 116. The user profiles database 116 can be also vertical specific, such that the profiles stored therein contain data specifically collected for the second vertical. Thus, if the second vertical is a dating service, a user profile stored at the user profiles database 116 would correspond to users who have accessed or registered for the dating service vertical, and that have provided information in order to participate in the dating service. In addition, many other verticals and associated computer infrastructure can communicate with the network server 106 in order to provide the user with the option of visiting various verticals. As such, other vertical engines 122 and other user profiles databases 120 can work as part of additional infrastructures or additional verticals.

In addition to collecting explicit data from a user, the network server 106 can further be configured to also collect duplicate data from the user. For example, the network server 106 can record user activity such as web requests, search areas, search results, safe listings, printed listings, e-mailed listings, biddings, purchases, registrations, requested media, uploaded media, etc. User activity can be stored at each of the user profiled databases specific to each vertical, namely, user profiles database 112, user profiles database 116 and any other user profiles databases 120.

The service provider 140 can also include a profiling module 110 that is configured to retrieve user specific data from each of the user profiles in each vertical of the service provider 140. As such, the profiling module 110 can include logic to calculate and retrieve the most reliable data from each of the user profiles 112, 116 and 120 to create cross-vertical horizontal profiles. Thus, the horizontal profiles created by the profiling module 110 can be shared across all verticals once the data has been harvested from each vertical.

In one embodiment, a demographic profiles database 124 can store horizontal profiles that include the most reliable data for each user and be shared across all verticals. For example, the demographic profiles database 124 can include a demographic profile for a user that stores demographic data such as first name, last name, age, gender, date of birth, salary, professional information, occupation, race, marital status, children, political affiliations, environmental patronage, etc. For each attribute of a demographic profile, one specific vertical might have more reliable data than others. For example, the jobs vertical can provide precise information regarding salary, education, experience and location of a user. In another example, a dating service vertical can provide accurate information about social habits and entertainment of the user. In yet another example, a shopping vertical can provide accurate information about spending habits, etc. Data collected from each of the verticals can be analyzed to derive precise and accurate user demographics as well as user behavior which can be stored in one or more horizontal profiles. As such, the demographic profiles database 124 can include detailed information regarding a user based on cross-sharing and cross-harvesting from multiple verticals.

Likewise, an access profiles database 126 can store a horizontal profile for a user that is indicative of Internet access habits. For example, the access profile of a user can be indicative of whether a user likes to access the Internet via a desktop, PDA or another computing device. In addition the access profile can also be indicative of frequently accessed services such as e-mail, instant messenger, blogs, syndication feed usage, etc.

In another embodiment, a preference profiles database 128 can also allow to store horizontal profiles that are indicative of user look and feel preferences. For example, document layout, format preferences, language preferences, etc. In yet another embodiment, a content profiles database 130 can also be utilized and derived by the profiling module 110 containing horizontal profiles of users and their content viewing habits. Thus, for example, content analysis documents viewed, saved, e-mailed or acted upon can be conducted and the results stored on the content profiles database 130.

In one embodiment, content analysis can be conducted via one or more algorithms and methods. In one example, the personalization method and content analysis can include clustering which is used to organize data as part of a vertical specific hierarchy. Thus, for example, content viewed in one or more verticals can be analyzed and clustered to be more relevant to a specific vertical than others. Another method used for content analysis can be for example a normalization method that allows the variations of a term to be mapped to a single recognizable value. In addition, a classification algorithm can also be utilized in order to bucket like terms as being equivalent for the purposes of searching in a vertical. Thus, user searches can provide more meaningful results.

Likewise, any horizontal profile can be utilized by any vertical in order to provide a personalized experience to the user based on data that has been learned from each vertical and made available to all of the other verticals via horizontal profiles.

In another embodiment, the service provider 108 can further be configured with a search engine 108. The search engine 108 can include logic to receive general web searches, and search using horizontal and vertical profiles of a user in order to populate the most relevant data. In addition, the search engine 108 can also be configured to receive vertical-specific search queries and search in information of each vertical using various user profiles in order to return relevant search results to the user. For example, the search engine 108 can utilize horizontal profiles in databases 124, 126, 128 and 130. In addition, the search engine 108 can also utilize profiles in vertical specific database such as user profiles database 112, profiles database 116, and/or other databases 120.

While various databases have described herein, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
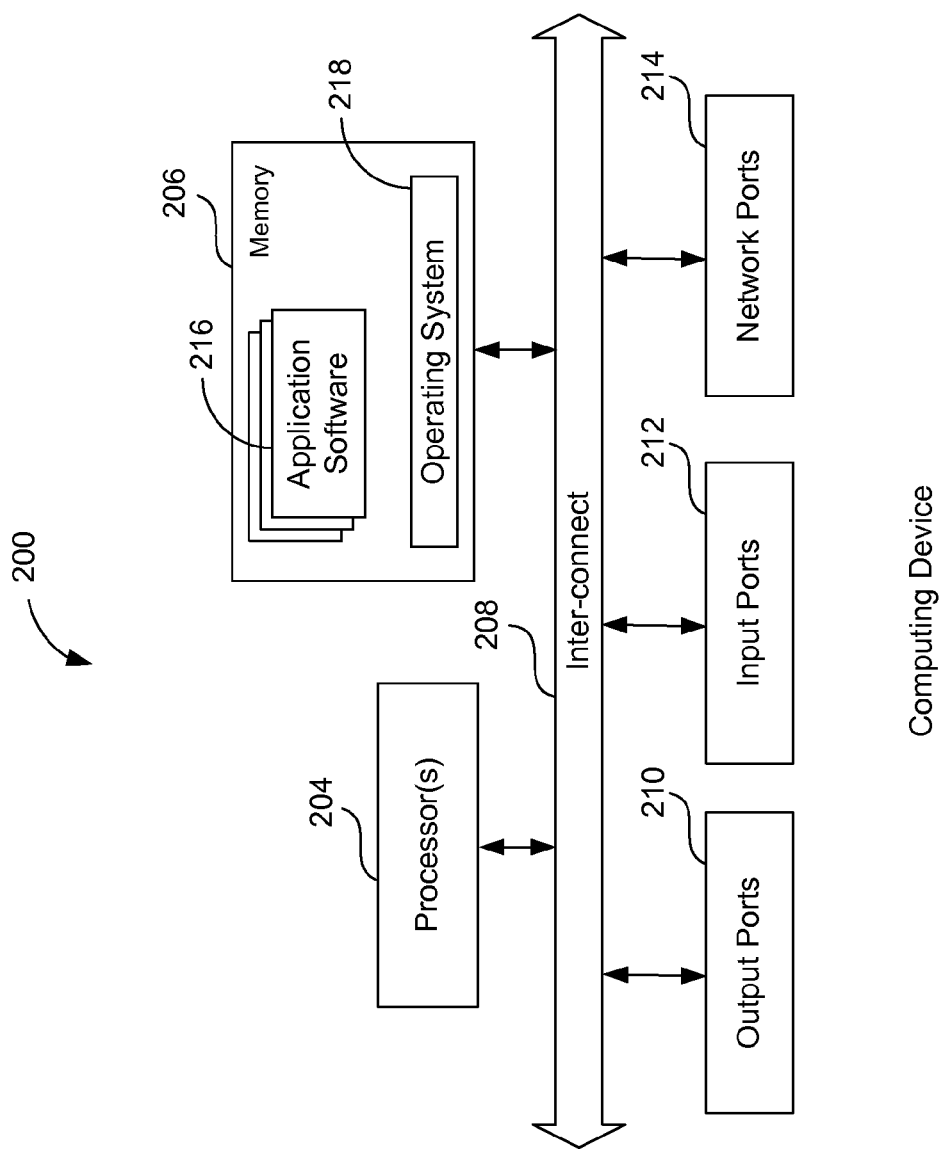
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, receive and transmit digital signals, as required by the user computing device 102. The computing device 200 can be utilized to process calculations, execute instructions, receive and transmit digital signals and/or data as required by the profiling module 110, the network server 106, and/or the search engine 108.

The computing device 200 can be any general or special purpose computer now known or to become known capable of performing the steps and/or performing the functions described herein, either in software, hardware, firmware, or a combination thereof.

The computing device 200 includes an inter-connect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output port 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The inter-connect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3A:
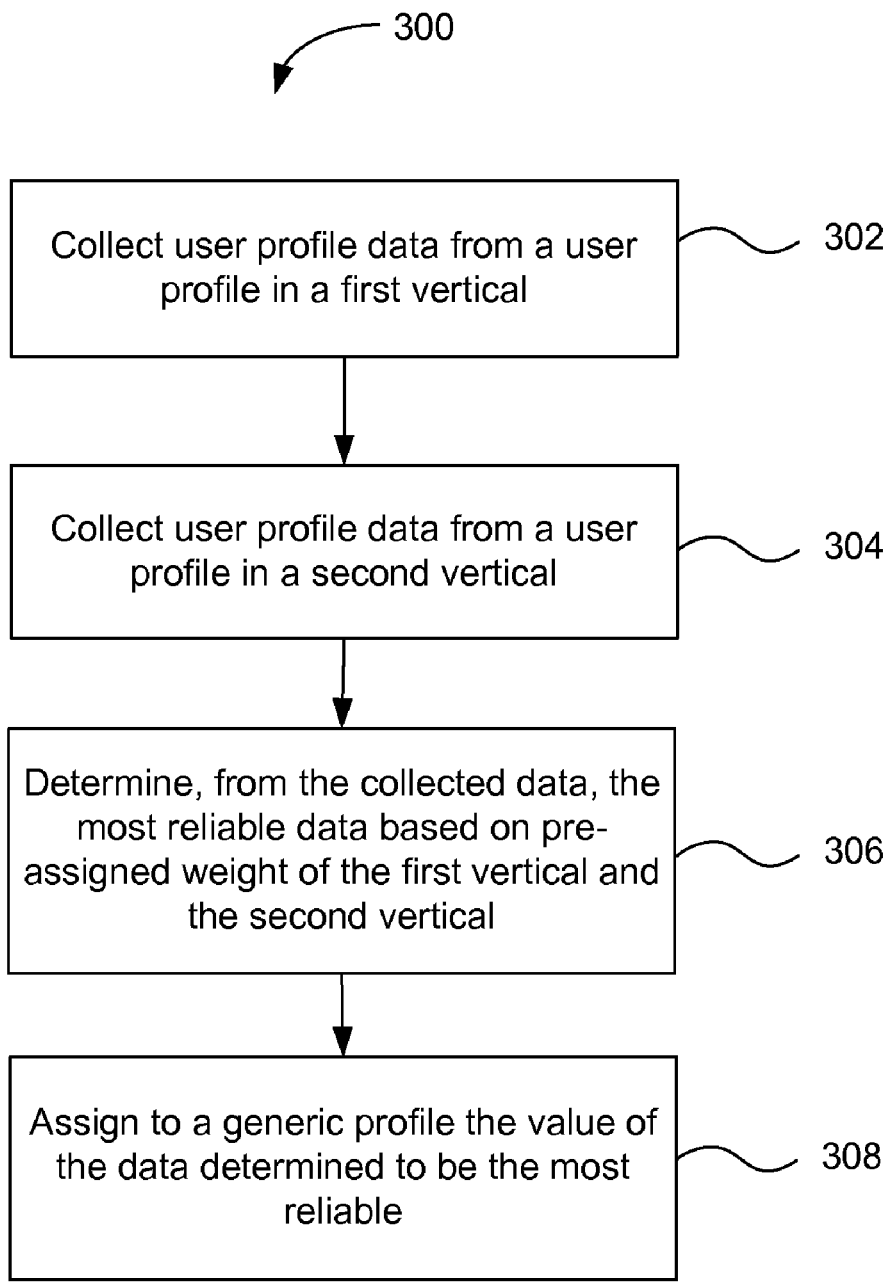
FIG. 3A depicts a flow diagram of a process for profiling a user according to one embodiment.

FIG. 3A depicts a flow diagram of a process for profiling a user according to one embodiment. At process block 302, user profile data is collected from a user profile in a first vertical. As previously mentioned, a profile of a user that is vertical-specific can include vertical specific information that can be collected to later be utilized in creating a horizontal profile. Process 300 continues at process block 304.

At process block 304, user profile data from a user profile in a second vertical can be collected. As such, the user data in the second vertical can be populated either thorough direct explicit user input or by collecting implicit user input (i.e., history of visited sites, click-through rate, viewed content, etc.). Process 300 continues at process block 306.

At process block 306, the most reliable data from the collected data can be collected based on pre-assigned weight of the first vertical and the second vertical. The pre-assigned weight of the first vertical can be established based on the reliability of attributes of the first vertical as related to the user. For example, as previously mentioned, if an attribute regarding salary or education for a jobs vertical is collected, such attribute as related to the jobs vertical would be weighted heavily. Process 300 continues at process block 308. At process block 308, a generic profile such as a demographic profile or any other horizontal profile can be updated with the value of the data determined to be the most reliable.

Figure 3B:
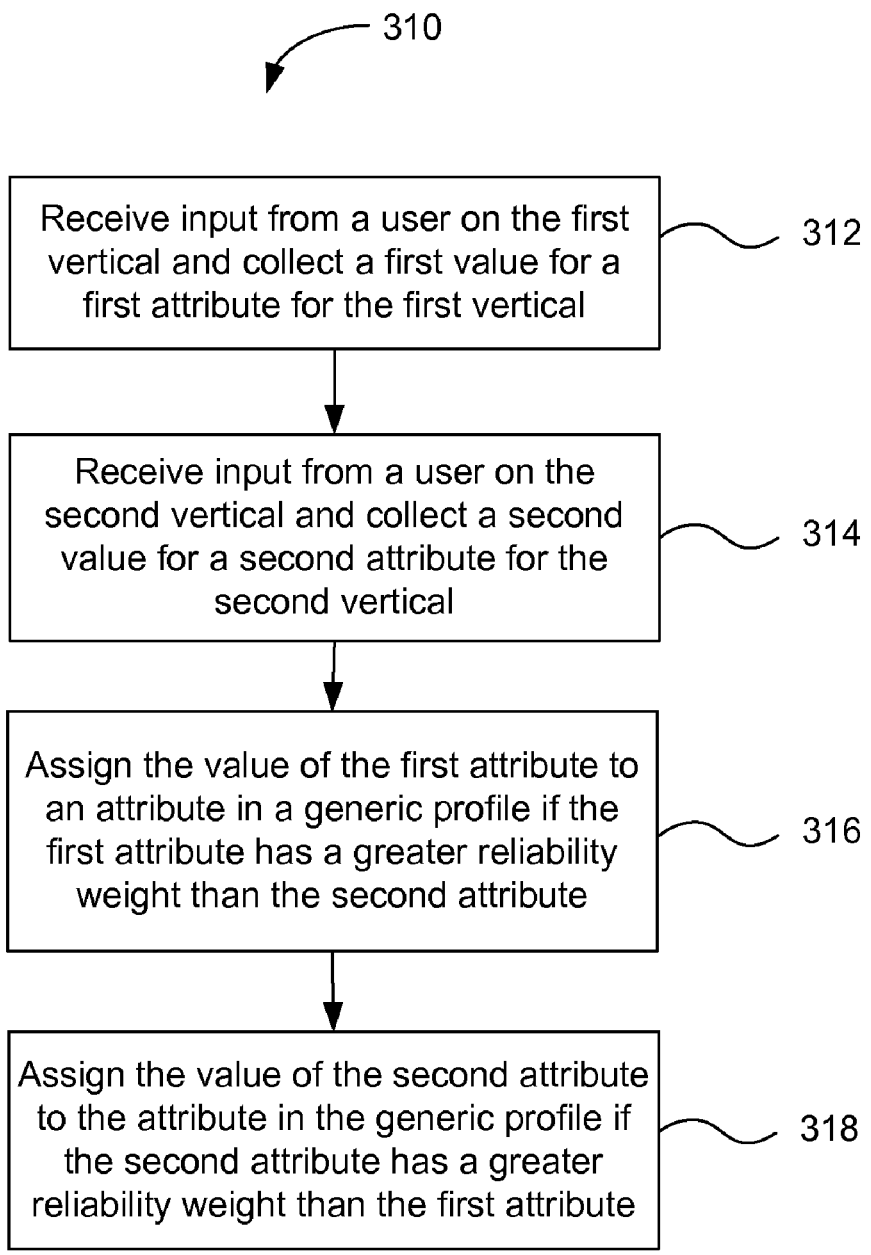
FIG. 3B depicts a flow diagram of a process for profiling a user according to another embodiment.

FIG. 3B depicts a flow diagram of a process for profiling a user according to another embodiment. At process block 312, user input corresponding to a first vertical can be received and collected as a first value. The first value can then be stored as a value for a first attribute on a database of a first vertical. Process 310 continues at process block 314.

At process block 314, a second input corresponding to a second vertical can be collected and stored as a second value for a second attribute that is stored in a database of a second vertical. Process 310 continues at process block 316. At process block 316, the value of the first attribute is assigned to an attribute of a generic profile if the first attribute has a greater reliability weight than the second attribute. The reliability weight of the first attribute can be pre-established based on the whether a user is likely to enter reliable information for the first attribute when interacting in the first vertical. Process 310 continues at process block 318.

At process block 318, the value of the second attribute is assigned to the attribute in the generic profile if the second attribute has a greater reliability weight than the first attribute. Again, the reliability weight of the second attribute can be pre-established based on the whether a user is likely to enter reliable information for the second attribute when interacting in the second vertical.

FIG. 4 depicts an exemplary table for weighting a jobs vertical user profile according to another embodiment. Table 400 illustrates a plurality of attributes that can be stored as part of a user profile. In addition, the corresponding weights for each attribute can also be illustrated as part of table 400. The exemplary table illustrated in table 400 can be utilized for weighting any user profile for a jobs vertical. In other words, the jobseeker user profile having attributes for job related demographic data can be weighted according to table 400. For example, education, salary, first name, last name includes data that a jobseeker would provide to a recruiter or employer for the purposes of obtaining employment. As such the data that a jobseeker provides to the employer or recruiter in seeking employment can generally be assumed to be reliable data because jobseekers would generally be truthful about demographic data provided to a recruiter or employer. As such, jobseeker profile attributes such as 418, 420, 422, 426, 428 and 430 corresponding to first name, last name, age, profession, education and salary levels are attributes that can be established to be highly reliable attributes. As such, the corresponding weight of each of such attributes can be 1. In other words, the attribute would be heavily weighted such that when in comparison to the attributes of other profiles of other verticals, the value of the aforementioned attributes has higher weight. Thus, weight 446, 448, 450, 454, 456 and 458 can be assigned a weight of 1.

Furthermore, gender attribute 424 can be assigned a weight 452 of 0.5. This weight would be indicative that the gender information provided by the job seeker may or may not be reliable. Likewise, other attributes, such as traveling habits, social habits 434, hobbies 436, entertainment 438, music preferences 440, spending habits 442 and technology preference 444 are not necessarily as reliable within the context of a jobs vertical. However, a jobseeker profile having an attribute of traveling habits 432 could be assigned a weight of 460 of 0.8, in comparison with a social habits attribute 434, which would only be assigned a weight 462 of 0.2. In other words, a jobseeker profile would be more indicative of traveling habits than social habits because during the course of employment, an individual or user might provide more reliable information regarding traveling (e.g., business travel), than social interaction and social activities.

FIG. 5 depicts an exemplary table for weighting a dating vertical user profile according to another embodiment. Table 500 illustrates multiple attributes for a user profile that has registered or interacts in a dating vertical. Attributes 518, 520, 522, 524, 528 and 530 corresponding to first name, last name, age, gender, education and salary level are attributes that are not necessarily reliable in the context of the dating profile. Therefore, the aforementioned attributes can be weighted lightly. In other words, the weight 546, 548, 550, 552, 556 and 558 can be assigned a weight of zero. In contrast, a social habits attribute 534, a hobbies attribute 536 and a music preferences attribute 540 are more reliable and therefore can be weighted more heavily. For example, the social habits attribute 534 can be assigned a weight 562 of 1, while the hobbies attribute 536 can be assigned a weight 564 of 0.75.

FIG. 6 depicts an exemplary table for weighting a shopping vertical user profile according to another embodiment. A shopping vertical can provide further information about a user that is indicative of user purchasing activities and behavior. Attributes such as hobbies 636 and spending habits 642 are highly reliable because within the shopping context, user shopping activities can be very indicative of hobbies and spending habits of the user. Thus, hobbies and spending activities user can be implicitly determined or the user can explicitly provided by the user. For instance, spending habits can be weighted heavily since the spending habits of a user within the shopping vertical can be clearly defined. As such, the hobbies attribute 636 can be provided a weight 664 of 0.7. In another example, the spending habits 642 can be provided a weight 670 of 1. Of course, other attributes within a shopping vertical can be derived accurately.

FIG. 7 depicts an exemplary table of a demographic user profile according to another embodiment. The table 700 illustrates a horizontal profile that is created based on values of vertical profiles corresponding to various verticals. As previously discussed, the demographic profile or other horizontal profiles as disclosed herein would be provided with a list of attributes that encompasses some or all of the attributes in each of the verticals and the value of each of the most reliable attributes based on the attributes having the highest weight. As such, the first name attribute 718, the last name attribute

720, the age attribute 722, the profession attribute 726, and the education attribute 728 can be assigned the value of the corresponding attributes in the job profile. Thus, values can be assigned based on the attributes having the highest or heaviest weights for each profile in each vertical. For example, the attribute of first name corresponding to the jobs vertical profile has a weight 446 of 1 in the jobs profile, a weight 546 of 0 in the dating profile, and a weight 646 of 0.9 in the shopping vertical. Therefore, because the weight for the attribute of first name 418 corresponding to the jobs vertical user profile is the highest, namely 1, value of the first name attribute 418 in the user profile will be the one that is used as value 746 of the demographic profile. Likewise, a social habits attribute 734 would be provided with the value corresponding to the dating profile social habits 534. This determination is made based on the weighting of attributes of all other user profiles of other verticals. Thus, for example, the attribute for social habits 434 for a jobs vertical only has a weight 462 of 0.2. The social habits attribute 634 for the shopping vertical user profile has a weight 662 of 0. In contrast, the social habits attribute 534 in the dating vertical has a weight 562 of 1. Therefore, because the social habits attribute 534 in the dating vertical has the greatest weight, the value corresponding to the social habits attribute 534 has been assigned as value 762, which is the value corresponding to attribute for the social habits 734 in the demographic profile.

In another example, spending habits attribute 734 can be provided with the value 770 of spending habits in the shopping profile. The spending habits attribute 642 has a weight of 1 in comparison to the weight of 0.6 for the spending habits attribute 542 and the weight 0.2 of the spending habits attribute 442. Thus, because these attributes have been weighted lightly, the value of the more heavily weighted attribute, namely the spending habits attribute 642 of the shopping vertical is used as the value 770 in the demographics profile.

One skilled in the art will recognize that this comparison of attribute weights can be executed for one or more attributes for multiple vertical user profiles. In addition, one or more attributes can be used for a specific horizontal profile such as the demographic profile. Another set of attributes can be utilized for a different horizontal profile, such as content profiles, preference profiles and access profiles.

Having access to multiple horizontal profiles, the search engine 108 can render more accurate and precise search results. Therefore, a user having one or more horizontal profiles as disclosed herein can be provided with better quality search results for both web searching in general as well as vertical specific searching. In addition, user profiling as disclosed herein permits personalization in various services across one or more verticals offered by the service provider 140. For example, user profiling as disclosed herein can be utilized to personalize search input from a user.

In another example, user profiling as disclosed herein can be utilized to personalize search input from a user. The search input from the user can be supplemented with location of the user, preferences, etc. so as to create a personalized search query. In another example, user profiling as disclosed herein can be utilized to personalize targeted advertisement and/or promotional material delivered to a user. In another example, user profiling as disclosed herein can be utilized to personalize recommendations of media, job listings, etc. In another example, user profiling as disclosed herein can be utilized to personalize electronic communications with the user such as email, instant messaging, wireless communication, etc.

While some examples of verticals, attributes, values, and weights have been provided herein, one skilled in the art will recognize that multiple variations and examples of verticals, attributes, values, and weights exist. Thus skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client of server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method comprising:

receiving, at a service provider computing device from a user computing device, a first input, relating to a first vertical, that populates a first vertical attribute in a first vertical profile the first vertical attribute holding a first value for a user characteristic;

receiving, at the service provider computing device from the user computing device, a second user input, relating to a second vertical, that populates a second vertical attribute in a second vertical profile the second vertical attribute holding a second value for the user characteristic;

assigning, via the service provider computing device, the first value of the first vertical attribute to an attribute in a generic profile if the first vertical attribute is determined to have a greater reliability weight than a reliability weight of the second vertical attribute;

assigning, via the service provider computing device, the second value of the second vertical attribute to an attribute in the generic profile if the second vertical attribute is determined to have a greater reliability weight than the reliability weight of the first vertical attribute;

assigning, via the service provider computing device, a heavy reliability weight to the first attribute in the first vertical if it is established, based on behavioral data for the user, that the user will provide reliable data for the second attribute in the second vertical; and assigning, via the service provider computing device, a heavy reliability weight to the second attribute in the second vertical if it is established, based on behavioral data for the user, that the user will provide reliable data for the second attribute in the second vertical.

2. The method of claim 1, wherein the first input comprises the selection of an item listed in the first vertical.

3. The method of claim 1, wherein the first input comprises the registration of the user in the first vertical.

4. The method of claim 1, wherein the second input comprises the selection of an item listed in the second vertical.

5. The method of claim 1, wherein the second input comprises the registration of the user in the second vertical.

6. The method of claim 1, further comprising:
receiving a web search request from the user computing device; and
searching data on the World Wide Web that is relevant to the attribute in the generic profile.

7. The method of claim 1, wherein the user characteristic is the first name, the last name, the age, the gender, the spending habits, or the social habits of the user.

8. The method of claim 1, wherein the first vertical is an Internet service such as an Internet job listing service, an Internet dating service, an Internet product comparison service, Internet automobile purchase service, Internet real estate service, an Internet travel service, an Internet media service, or an Internet social networking service.

9. The method of claim 1, wherein the second vertical is an Internet service such as an Internet job listing service, an Internet dating service, an Internet product comparison service, Internet automobile purchase service, Internet real estate service, an Internet travel service, an Internet media service, or an Internet social networking service.

10. The method of claim 1, wherein the generic profile is a demographic profile.

11. The method of claim 1, wherein the generic profile is a content profile.

12. The method of claim 1, wherein the generic profile is a user access profile.

13. The method of claim 1, wherein the generic profile is a preferences profile.

14. The method of claim 1, wherein the generic profile is accessible to the first vertical through a first vertical engine.

15. The method of claim 1, wherein the generic profile is accessible to the second vertical through a second vertical engine.

16. The method of claim 1, further comprising utilizing the generic profile to personalize search input from a user, search results from a user search, targeted advertisement, or electronic communications.

17. A system comprising:
a network server that receives from a user computing device a first input, relating to a first vertical, utilized to populate a first vertical attribute in a first vertical profile the first vertical attribute holding a first value for a user characteristic, the network server further configured to receive from the user computing device a second user input, relating to a second vertical, utilized to populate a second vertical attribute in a second vertical profile the second vertical attribute holding a second value for the user characteristic; and
a profiling module implemented by a service provider computing device that creates a generic profile, the profiling module configured to assign the first value of the first vertical attribute to an attribute in the generic profile if the first vertical attribute is determined to have a greater reliability weight than a reliability weight of the second vertical attribute, the profiling module further configured to assign the second value of the second vertical attribute to an attribute in the generic profile if the second vertical attribute is determined to have a greater reliability weight than the reliability weight of the first vertical attribute,
wherein the profiling module is further configured to assign a heavy reliability weight to the first attribute in the first vertical if it is established, based on behavioral data for the user, that the user will provide reliable data for the second attribute in the second vertical, and
wherein the profiling module is further configured to assign a reliability weight to the second attribute in the second vertical if it is established, based on behavioral data for the user, that the user will provide reliable data for the second attribute in the second vertical.

18. The system of claim 17, wherein the first input comprises a selection of an item listed in the first vertical.

19. The system of claim 17, wherein the first input comprises a registration of the user in the first vertical.

20. The system of claim 17, wherein the second input comprises a selection of an item listed in the second vertical.

21. The system of claim 17, wherein the second input comprises a registration of the user in the second vertical.

22. The system of claim 17, further comprising a search engine that receives a web search request from the user computing device, the search engine further configured to search data on the World Wide Web that is relevant to the attribute in the generic profile.

23. The system of claim 17, wherein the user characteristic is the first name, the last name, the age, the gender, the spending habits, or the social habits of the user.

24. The system of claim 17, wherein the first vertical is an Internet service such as an Internet job listing service, an Internet dating service, an Internet product comparison service, Internet automobile purchase service, Internet real estate service, an Internet travel service, an Internet media service, or an Internet social networking service.

25. The system of claim 17, wherein the second vertical is an Internet service such as an Internet job listing service, an Internet dating service, an Internet product comparison service, Internet automobile purchase service, Internet real estate service, an Internet travel service, an Internet media service, or an Internet social networking service.

26. The system of claim 17, wherein the generic profile is a demographic profile.

27. The system of claim 17, wherein the generic profile is a content profile.

28. The system of claim 17, wherein the generic profile is a user access profile.

29. The system of claim 17, wherein the generic profile is a preferences profile.

30. The system of claim 17, wherein the generic profile is accessible to the first vertical through a first vertical engine.

31. The system of claim 17, wherein the generic profile is accessible to the second vertical through a second vertical engine.

32. The system of claim 17, wherein the generic profile is utilized to personalize search input from a user, search results from a user search, targeted advertisement, or electronic communications.

* * * * *